United States Patent [19]

Ruble

[11] 4,058,590

[45] Nov. 15, 1977

[54] CARBON BLACK REACTOR WITH TURBOFAN

[75] Inventor: Theodore A. Ruble, Fort Worth, Tex.

[73] Assignee: Sid Richardson Carbon & Gasoline Co., Forth Worth, Tex.

[21] Appl. No.: 676,688

[22] Filed: Apr. 14, 1976

[51] Int. Cl.$^2$ .................... C01B 31/02; C09C 1/48; C01B 49/00

[52] U.S. Cl. ................................. 423/449; 423/450; 23/259.5

[58] Field of Search ................ 23/259.5; 60/39.07; 423/445, 449, 450, 453, 455, 456, 457

[56] References Cited

U.S. PATENT DOCUMENTS

| | | | |
|---|---|---|---|
| 2,482,819 | 9/1949 | Williams | 60/39.18 C |
| 3,289,409 | 12/1966 | Shirmer | 423/450 X |
| 3,463,421 | 8/1969 | Pyptiuk | 60/226 X |
| 3,498,750 | 3/1970 | Whitsel | 423/456 |
| 3,663,172 | 5/1972 | Foster-Pegg | 423/450 |

Primary Examiner—O. R. Vertiz
Assistant Examiner—Gregory A. Heller
Attorney, Agent, or Firm—W. Ronald Robins

[57] ABSTRACT

Apparatus and method are disclosed for manufacturing carbon black. The apparatus includes in contiguous axial alignment, a turbofan engine, an afterburner downstream of the turbine and a furnace-type carbon black reactor having means for radial introduction of feedstock. In a preferred embodiment, the turbine provides a first stream of high temperature, high pressure oxygen-containing gas to the afterburner for further combustion and subsequent use as supply air for a first carbon black reactor, and also provides a second stream of lower temperature and pressure air for cooling the first reactor shell and for use as supply air to a second carbon black reactor. This abstract is not to be construed in any way to define or limit the invention set forth below.

9 Claims, 2 Drawing Figures

CARBON BLACK REACTOR WITH TURBOFAN

BACKGROUND OF THE INVENTION

This invention relates to the manufacture of carbon black, and particularly to the types of carbon black used in compounding rubber, such as, for example, rubber for automobile tires. It relates specifically to the furnace process for making carbon black. It is concerned with the use of a unique combination of the component elements of gas turbine technology and carbon black technology.

For several decades in the early history of the automobile industry, the carbon black for compounding rubber for tires was furnished largely by the channel black process, in which gas flames a few inches high deposited carbon on channel irons in the presence of a deficient air supply. For economic reasons, the channel process has been almost wholly replaced by variants of the furnace process.

The apparatus of the furnace type process usually consists of a source of free-oxygen-containing gas, such as air from a blower, a combustion zone, a reaction zone, a quench zone, and a collecting system. The hot gases produced by the combustion of fuel in the combustion zone are confined in a flow through a reaction vessel, usually a steel shell lined with refractory, and ordinarily of circular cross-section. A feedstock hydrocarbon, usually an oil, which is the chief source of product carbon in the system, is injected into the flowing hot gases downstream of a point where the combustion of fuel is essentially complete. As the oil enters the flowing hot gases, it evaporates, and goes through pyrolysis, a series of thermal cracking and chemical reaction process steps in the reactor which produce carbon black in the reaction zone. The hot gases containing the carbon black are then quenched with water spray in the quench zone to a temperature low enough to stop the reactions, and to allow the carbon to be collected in a conventional collecting system.

There are two general categories of furnace carbon blacks used in the automotive tire industry: the so-called soft blacks used, largely in tire carcasses; and the blacks which impart high abrasion resistance to rubber used in tire thread, commonly known as "tread blacks". The tread blacks are much finer than the carcass blacks; that is, the particles are much smaller, and they have as a result, more surface area per unit of mass. The two types of carbon blacks are made under different reaction conditions, with the tread grade blacks being made at higher velocities (necessitating higher initial pressures), higher temperatures, and lower ratios of hydrocarbon feedstock to hot flowing gases than the carcass blacks.

In the conventional furnace process, the hot gases used for pyrolysis of the feedstock oil are produced by burning a hydrocarbon fuel, usually natural gas, in a stream of process air furnished by a blower. The hot gases from this combustion are at temperatures suitable for the cracking of a feedstock hydrocarbon to carbon black, generally 2000° to 3400° F. The feedstock hydrocarbon is then injected by suitable means into the stream of hot gases, which entrain the feedstock during its conversion to carbon black, and the carbon black after it is formed.

In conventional carbon black manufacturing processes, the process air may be preheated prior to combustion of the hydrocarbon fuel by indirect heat exchange with the hot, carbon-containing gases leaving the reaction zone. Such preheating of process air is especially useful in the manufacture of tread grade blacks, which require higher temperatures, since it raises the temperature of the combustion products while requiring the burning of less fuel. However, if an air to fuel ratio a little above stoichimetric is used, preheating the air may cause such high temperatures as will damage the refractory, or even melt it. The higher the temperature to which the air is preheated, the higher the air to fuel ratio must be to prevent overheating; that is, the flame must be more lean with respect to fuel. Thus, raising the air preheat temperature leads to increased free oxygen in the products of combustion. In cases of high air preheat to about 1000° F, the amount of air may be as high as twice the stoichiometric quantity. The result is a significant portion of the feedstock is burned, rather than converted to carbon black. The first increments of air preheat above ambient temperature have been reported to increase the yield of carbon black based on feedstock, by speeding up the carbonization reeaction which competes with the oxidation reactions. At a point, however, depending upon the character of the feedstock, the process parameters, and residence time, the yield based on feedstock begins to decline. It is, then, desirable for the combustion zone of the reactor to produce combustion gases at the highest temperature which the refractory can continuously withstand, but with limited free oxygen.

One method commercially available for producing an oxygen containing gas with an oxygen content less than that of air, and from which a portion of the heat released by consumption of a part of the oxygen has been removed and put to a useful purpose, is to use the tail gases from a gas turbine or "turbofan" engine as process air for the reactor. The basic components of a gas turbine system are a combustor, a compressor, and a turbine. The compressor supplies air under pressure to the combustor where ordinarily a liquid fuel is burned, and from which hot gases flow at high velocity, with high energy content, into the turbine. The gases produce a rotary motion of the turbine as a result of being deflected by rings of blading on the rotor. The heat content of the gases is reduced by an amount proportional to the work done in rotating the turbine, and their temperature is correspondingly reduced. The turbine then drives the compressor which supplies air to the combustor. The combustion in the combustor must operate lean in fuel, i.e., at a ratio of air to fuel much higher than stoichiometric, to avoid overheating and damaging the blading of the turbine. As a result of these conditions, the exhaust gases from the turbine have a free oxygen content, but less than air; and are preheated, but a portion of the heat released by the combustor has been removed by doing the useful work of compressing air for the combustor. The turbine may, in addition, do other work, such as driving an electric generator, or furnishing direct motive power.

OBJECTS OF THE INVENTION

The principal object of the invention is to provide a method and apparatus for the manufacture of carbon black utilizing a conventional turbofan engine to provide compressed, preheated supply air, of reduced free oxygen content, to a carbon black reactor.

Another object is to provide such a method and apparatus in which the turbofan engine also provides a flow of compressed air at ambient temperature which may be circulated around the reactor body as a collant.

A further object of the invention is to provide a method and apparatus for flexibly producing both carcass grades and tread grades of carbon black in which combustion supporting gas at high temperature, but leaner in free oxygen than air, is supplied to the combustion section of a carbon black reactor to provide reactor conditions for more efficient use of feedstock.

Another object of the invention is to provide such a method and apparatus which includes means for using liquid fuel instead of gaseous fuel to furnish hot process gases to a carbon black reactor. Still another object of the invention is to eliminate the use of electrically-driven or stream-driven air blowers for supplying process air to a furnace-type carbon black reactor and to provide free-oxygen-containing gas for two types of reactors with the same machinery.

An important purpose of the invention is to provide cooling means to the metal shell of the reactor so that the thickness of the refractory may be reduced.

A major object of the invention to reduce the investment costs of a carbon black apparatus using a gas turbine by placing the turbine exhaust in essentially contiguous axial alignment with a tread-grade carbon black reactor which includes means for radial injection of the feedstock.

These and other objects and advantages of the invention will become apparent from the drawings, detailed description and claims.

DESCRIPTION OF THE PRIOR ART

U.S. Pat. No. 3,256,066 to Higgins and U.S. Pat. No. 3,490,869 to Heller, among others, describe typical apparatus for making fine, tread grade carbon blacks. U.S. Pat. No. 2,976,127 to Latham and U.S. Pat. No. 3,607,058 to West et al disclose reactors adaptable to the production of coarse, carcass grade, carbon blacks.

British Pat. No 821,573 and U.S. Pat. Nos. 3,463,612 and 3,498,750 disclose the use of turbofan engines to furnish electrical power, or a portion of the combustion gas in carbon black manufacturing facilities.

A number of patents disclose or illustrate the transfer of heat from the reactor wall to the reactor combustion air. Among these are Canadian Pat. No. 568,933 and U.S. Pat. Nos. 2,785,054, 3,012,864, 3,256,065, 2,924,512, 2,976,128 and 3,256,066. In each instance, the air flows countercurrent to the flow in the reactor and the air is used as process air in the reactor from which it derives its heat.

DETAILED DESCRIPTION OF THE DRAWINGS

In the accompanying drawings, in which like numerals indicate like parts:

DESCRIPTION OF THE PREFERRED EMBODIMENT

Figure 1:
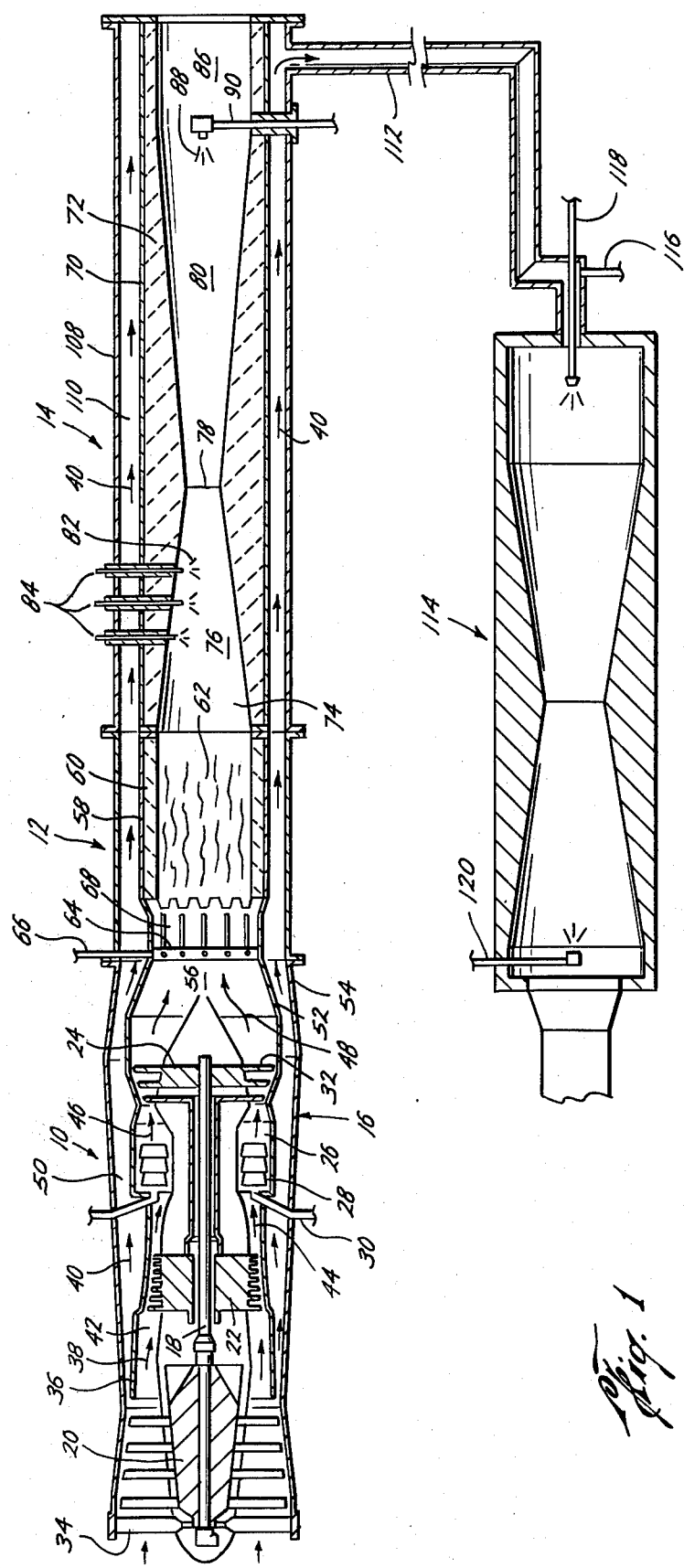
FIG. 1 is a somewhat diagrammatic illustration, in vertical section, of a preferred embodiment of the present invention in which a two-stage gas turbofan engine provides process air for a high pressure carbon black reactor in essentially contiguous axial alignment with the turbine exhaust and also provides heated process air to a low pressure reactor in the same plant.

Referring now to FIG. 1, there is illustrated apparatus in accordance with the preferred embodiment of the present invention comprising, in essentially axial, contiguous alignment and in open communication, a conventional turbofan engine 10, an afterburner 12, which functions as the combustion chamber of a carbon black reactor, and a carbon black reactor 14 provided with means for introducing feedstock radially at a plurality of locations spaced along the longitudinal axis of the reactor.

Generally, the turbofan engine 10 consists of a metal body 16 in which is rotatably mounted a shaft 18 extending longitudinally of the turbofan body. On the shaft 18 are affixed a low pressure rotary compressor 20, a high pressure rotary compressor 22 and a gas turbine 24. Rotation of the turbine 24 drives the two compressors through the shaft 18. The turbine 24 is driven by hot combustion gases from a combustor 26. Liquid fuel supplied to burners 28 in the combustion section 26, through piping 30, is burned under pressure to generate large volumes of hot gases which pass at high velocity through the blades 32 of turbine 24 mounted on the shaft 18. Rotation of the turbine 24 and shaft 18 powers the two rotary compressors on the same shaft. The low pressure compressor 20 takes in ambient air through intake 34 and furnishes a large volume of relatively low pressure air (approximately 1 to 6 psi) which is split by a controller 36 into two streams 38 and 40. The first stream 38 is directed through conduit 42 to the high pressure compressor 22 from which it is exhausted as a higher pressure air stream 44 at a pressure of about 3 to 15 psi. The high pressure air stream 44 is then supplied to the combustor 26 to provide high pressure combustion air for the liquid fuel injected through burners 28. The hot combustion product gases from the combustor 26 are then discharged as gas stream 46 at high velocity into the turbine 24 giving it rotary motion, with which it drives the compressors, as described, and is discharged as stream 48, at approximately 2 to 14 psi and 650° to 1500° F. Since the combustor 26 is operated relatively lean in fuel, stream 48 still contains free oxygen, but less than that of ambient air.

The second low pressure air stream 40, which is not needed for combustor 26, flows through an annular space 50 between inner and outer shells 52 and 54 respectively, comprising the body 16 of the engine, and is discharged parallel with, and in surrounding annular relation to, the turbine discharge stream 48.

In the turbofan engine commonly used for aircraft propulsion, the second low pressure air stream 40 and the turbine exhaust 48 may combine in a propelling nozzle. In the arrangement of this invention, the two exit streams are kept separate: the high pressure turbine exhaust stream 48, still rich in free oxygen, and at a temperature of 650° – 1500° F (depending on the ratio of air to fuel in the combustors), flows through a plenum 56 and directly, without intermediate piping, into the afterburner 12 which produces a high velocity stream of gases at carbon black formation temperature for the tread grade carbon black reactor 14.

The afterburner 12 comprises a generally cylindrical metal shell or body 58 lined with refractory 60 which defines a cylindrical combustion space 62. At the upstream end of the afterburner are a fuel nozzle ring 64 supplied with liquid combustion fuel through supply pipe 66. The fuel nozzle ring 66 adds fuel to the hot oxygen containing gas stream 48 flowing from the plenum 56 and a flame holder 68 downstream from the fuel nozzle ring stabilizes the resulting flame which completes its burning in the combustion space 62. This second combustion step raises the temperature of the gas stream to about 3000° F and while reducing its free oxygen content to a level of about 0 to 5%.

Immediately downstream from the afterburner 12 and in contiguous axial alignment is a front carbon black reactor 14 comprising a metal shell or body 70, generally circular in cross-sectional configuration, and lined with refractory material 72 defining a reaction tunnel 74. The reaction tunnel 74 includes a converging section 76, a throat or construction 78 and a diverging section 80.

Figure 2:
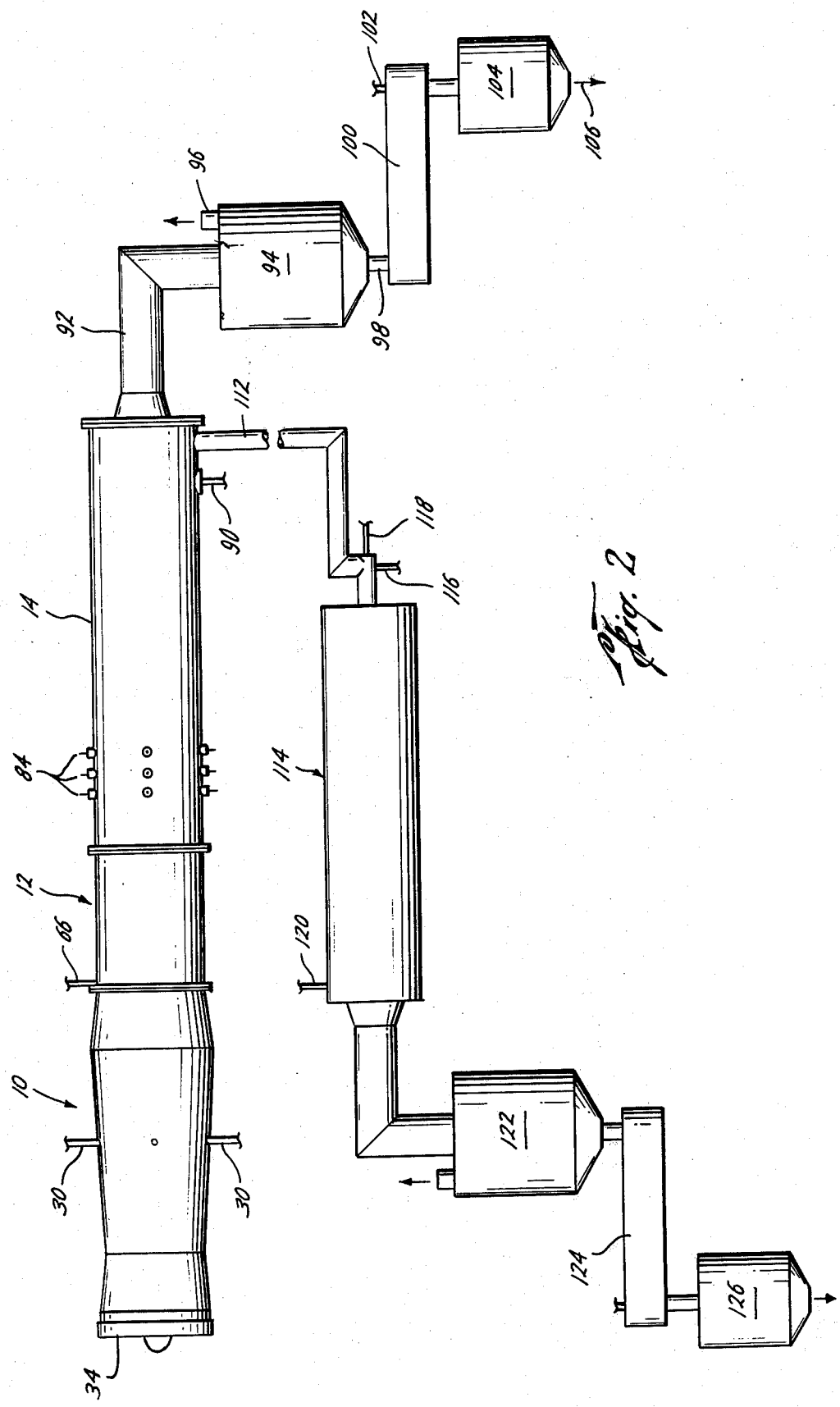
FIG. 2 is a somewhat diagrammatic illustration of a complete carbon black manufacturing facility utilizing the apparatus of FIG. 1.

In operation, the hot products of combustion from the afterburner 12 flow into the converging section 76 of the reactor in essentially linear, non-tangential flow. Liquid petroleum feedstock 82 is then injected into the hot flowing gases through one or more of a plurality of feedstock injection tubes 84 extending radially into the reaction tunnel at a plurity of points spaced along the longitudinal axis of the reactor. Although only one set of radial feedstock injection tubes 84 is illustrated in FIG. 1, a plurality of such tubes may be provided spaced circumferentially around the reactor body as shown in FIG. 2. By providing for essentially radial injection of the hydrocarbon feedstock 82 into the linear flow of combustion gases from the afterburner 12 increased despersion of the feedstock in the gases is obtained. Use of a plurality of the sets of feedstock injection tubes 84 spaced along the longitudinal axis of the reaction tunnel provides control over the structural characteristics of the final product by regulating the length of reaction time as the gases flow through the reactor. Furthermore, use of radial feedstock injection (as opposed to the conventional axial injection) permits the axial, contiguous alignment of the turbofan engine 10, afterburner 12 and reactor 14, without the use of intervening ducting or the like, resulting in economies of construction and operation.

The reactions forming carbon black take place as the mixture of hot gases and feedstock flow downstream through the converging section 76, reactor throat 78 and diverging section 80 toward the quench zone 86 where the reactions are stopped by the sudden cooling of the mixture of gases and entrained carbon black product by the injection of quench water 88 through quench pipe 90. From the quench zone 86, the gases may flow through conduit 92 into a conventional filtering apparatus 94 which separates the carbon black from the gases. The entrained gases are vented through line 96 and the carbon black exits through line 98 to pelletizer 100 in which it formed into pellets with the addition of water from line 102. The wet pellets then go to dryer 104 from which the final product 106 is produced.

Circumferentially surrounding the metal shells 58 and 70 comprising the bodies of the afterburner 12 and reactor 14 is an outer metal shell 108. The annular space 110 between the concentric metal shells is in communication with the annular space 50 in the turbofan engine 10 so that the second stream 40 of low pressure air from the low pressure compressor 20 flows in concurrent surrounding flow to the afterburner 12 and reactor 14 to cool the respective metal shells 58 and 70, permitting the use of thinner refractory lining for those bodies than would be possible without the use of such cooling. The heated air stream 40 then exits from the annular space 110 through conduit 112 and thence to any desired use. Possible uses are for generating steam, and, indirectly, electricity, as drying air for the dryer 104 or any other desired use.

A preferred use of the stream 40 is as pre-heated process air for a second carbon black reactor 114 which operates at lower temperatures and pressures for the production of carcass grade carbon blacks. The air stream 40 from conduit 112 at a temperature of about 200° F to 600° F is admixed with fuel from supply line 116 and the mixture ignited to provide a stream of hot flowing gases at a temperature of about 2500 to 3500 into which feedstock hydrocarbon is supplied through pipe 118. The resulting reaction is quenched by water supplied through pipe 120. The off gases entraining the carbon black formed in the second reactor 114 are then treated downstream in Filter pelletizer 122 and dryer 126 to produce the final carcass black product through conventional steps known to those skilled in the art.

The foregoing description and disclosure is illustrative and explanatory only, and various changes in the size, shape and materials of construction may be made within the scope of the appended claims without departing from the spirit of the invention.

What is claimed is:

1. An apparatus for the production of carbon black comprising:
   a turbofan engine comprising,
   a body,
   a rotary compressor and a gas turbine rotatably mounted in said housing and interconnected whereby rotation of said turbine drives said compressor.
   means for supplying air to said compressor,
   a combustor,
   means for conducting compressed air from said compressor to said combustor,
   means for supplying hydrocarbon fuel to said combustor for admixture with said compressed air,
   means for conducting hot products for combustion from said combustor to said turbine for rotating said turbine to thereby drive said compressor;
   an afterburner located downstream of said turbofan engine, axially aligned therewith, contiguous thereto and in open communication therewith for receiving the gases exhausted from said turbine,
   said afterburner including means for supplying liquid fuel thereto for additional combustion with the gases exhausted from said turbine to thereby increase the temperature and reduce the free-oxygen content of said exhausted gases; and
   a furnace-type carbon black reactor located downstream of said afterburner, axially aligned therewith, contiguous thereto and in open communication therewith for receiving the hot products of combustion from said afterburner,
   said reactor including a reaction tunnel,
   means for introducing hydrocarbon feedstock radially into said reactor tunnel,
   means for quenching the reaction in said reaction tunnel; and
   means for collecting the carbon black product.

2. The apparatus according to claim 1 wherein said means for introducing hydrocarbon feedstock radially into said reactor tunnel comprise a plurality of injection wands disposed radially around said tunnel in a plane perpendicular to the longitudinal axis of said tunnel.

3. The apparatus according to claim 2 wherein a plurality of sets of said co-planer injection wands are provided spaced long the longitudinal axis of said tunnel, whereby said hydrocarbon feedstock may be injected radially into said tunnel at a plurality of points along said longitudinal axis.

4. An apparatus for the production of carbon black comprising:
   a turbofan engine comprising,
   a body,
   shaft means rotatably mounted in said body and extending longitudinally thereof,
   low pressure rotary compressor means mounted on said shaft at one end thereof,
   means for dividing the airstream from said low pressure compressor means into first and second low pressure airstreams,
   high pressure rotary compressor means mounted on said shaft for further compressing one of said low pressure airstreams to produce a higher pressure stream,
   combustor means located downstream of said high pressure compressor means,
   means for conducting said higher pressure airstream from said high pressure compressor means to said combustor,
   means for supplying liquid hydrocarbon fuel to said combustor for admixture with said higher pressure airstream,
   rotary turbine means on said shaft downstream from said combustor means,
   means for conducting hot products of combustion from said combustor to said rotary turbine for rotating said turbine to thereby rotate said shaft and drive said low pressure and high pressure compressors;
   an afterburner located downstream from said turbofan engine, axially aligned therewith, contiguous thereto and in open communication therewith for receiving the hot combustion products exhausted from said rotary turbine,
   said afterburner including means for supplying liquid fuel thereto for additional combustion to thereby increase the temperature and reduce the free-oxygen content of the gases exhausted from said rotary turbine; and
   carbon black reactor means located downstream of said afterburner, contiguous thereto and in open communication therewith and having its longitudinal axis aligned with the longitudinal axis of said afterburner and said turbofan engine, for receiving the hot products of combustion from said afterburner,
   said reactor including a generally cylindrical body,
   refractory material lining the inside of said reactor body to define a reaction tunnel,
   means for conducting the hot products of combustion from said afterburner into said reaction tunnel,
   means for introducing hydrocarbon feedstock radially into said hot products of combustion flowing in said reaction tunnel,
   means for quenching the reaction in said reaction tunnel,
   meand for collecting the carbon black product,
   a cylindrical shell surrounding the body of said reactor and spaced therefrom to define an annular space surrounding said reactor,
   means for conducting the second low pressure stream of compressed air from said low pressure compressor in said turbofan engine to said annular space,
   whereby said low pressure airstream flows through said annular space in surrounding relationship to said reactor body to thereby cool said reactor body and simultaneously heat said low pressure airstream.

5. The apparatus according to claim 4 comprising additionally:
   a second carbon black reactor,
   conduit means for conducting said heated low pressure airstream from said annular space to said second carbon black reactor means,
   means for introducing a liquid fuel into said heated low pressure airstream for combustion to provide hot products of combustion to said second carbon black reactor,
   means for introducing hydrocarbon feedstock into said hot products of combustion in said second carbon black reactor,
   means for quenching the reaction in said second carbon black reactor.

6. A process for manufacturing carbon black comprising:
   compressing air with a rotary compressor;
   burning a liquid fuel in said compressed air to produce hot combustion product gases still containing free oxygen,
   rotating a turbine with said hot combustion product gases to drive said compressor;
   burning liquid fuel in the free-oxygen containing gas discharged from said turbine in an afterburner to thereby increase the temperature and reduce the free-oxygen content of said discharged gas;
   conducting the hot products of combustion from said afterburner into a carbon black reactor;
   injecting feedstock hydrocarbon radially into the hot gases flowing in said reactor to form carbon black;
   cooling the reaction products in said reactor; and
   collecting the carbon black products.

7. A continuous process for the production of carbon black by the pyrolysis of hydrocarbon feedstock comprising:
   compressing an oxygen-containing gas to a first pressure by means of a first compressor;
   dividing said oxygen-containing gas from said first compressor into two streams;
   compressing one of said two streams to a second, higher pressure by means of a second compressor;
   conducting the higher pressure stream of oxygen-containing gas from said second compressor to a combustion zone;
   burning a hydrocarbon fuel in the higher pressure oxygen-containing gas in said combustion zone to produce combustion product gases still containing free oxygen;
   passing the combustion product gases from said combustion zone through a gas turbine and extracting a portion of the energy thereof to drive the first and second compressors;
   passing the effluent gases from the turbine at a temperature of about 500° F to about 1550° into an afterburner;
   burning a hydrocarbon fuel in the afterburner in the presence of the oxygen-containing gases from the turbine effluent to produce combustion product gases having a temperature of from about 2000° F to about 3400° F and having reduced free-oxygen content:

conducting the combustion product gases at about 2000° F to 3400° F to a carbon black reactor;

injecting a hydrocarbon feedstock radially into the hot gases flowing in said carbon black reactor;

quenching the reaction products in said carbon black reactor; and collecting the carbon black so produced.

8. The method according to claim 7 comprising additionally the steps of:

passing the second stream of lower pressure oxygen-containing gas from said first compressor through an annular space surrounding said carbon black reactor, thereby cooling the reactor shell and absorbing heat from said reactor into said second stream of lower pressure gas;

passing the heated low pressure gas stream from said annular space to a second carbon black reactor;

burning a hydrocarbon fuel in the heated low pressure airstream in said second carbon black reactor to produce hot products of combustion;

injecting hydrocarbon feedstock into the hot combustion product gases in said second reactor to pyrolize said hydrocarbon feedstock and produce carbon black;

quenching the reactions in said second reactor; and collecting the carbon black product from said second reactor.

9. The method according to claim 8 wherein said second stream of lower pressure oxygen-containing gases flows through said annular space in concurrent relationship to the gases flowing in said first carbon black reactor.

* * * * *